US010061983B2

(12) United States Patent
Yoneyama

(10) Patent No.: US 10,061,983 B2
(45) Date of Patent: Aug. 28, 2018

(54) TRACKING APPARATUS, TRACKING METHOD, AND NON-TRANSITORY STORAGE MEDIUM STORING TRACKING PROGRAM

(71) Applicant: OLYMPUS CORPORATION, Hachioji-shi, Tokyo (JP)

(72) Inventor: Hisashi Yoneyama, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 108 days.

(21) Appl. No.: 14/985,598

(22) Filed: Dec. 31, 2015

(65) Prior Publication Data

US 2016/0110604 A1 Apr. 21, 2016

Related U.S. Application Data

(63) Continuation of application No. PCT/JP2014/067941, filed on Jul. 4, 2014.

(30) Foreign Application Priority Data

Jul. 4, 2013 (JP) ................................ 2013-140934

(51) Int. Cl.
*G06K 9/00* (2006.01)
*H04N 5/232* (2006.01)
(Continued)

(52) U.S. Cl.
CPC ..... *G06K 9/00624* (2013.01); *G06K 9/00268* (2013.01); *G06K 9/4652* (2013.01);
(Continued)

(58) Field of Classification Search
CPC combination set(s) only.
See application file for complete search history.

(56) References Cited

U.S. PATENT DOCUMENTS 6,335,985 B1 * 1/2002 Sambonsugi ........ G06K 9/3241
382/190
7,362,219 B2 * 4/2008 Nogami ............. G06K 7/10079
235/384
(Continued)

FOREIGN PATENT DOCUMENTS

CN 101098461 A 1/2008
CN 101127122 A 2/2008
(Continued)

OTHER PUBLICATIONS

Extended European Search Report mailed in corresponding European Patent Application No. 14820059.5 dated Jan. 24, 2017, consisting of 9 pp.
(Continued)

*Primary Examiner* — Tsung-Yin Tsai
(74) *Attorney, Agent, or Firm* — Volpe and Koenig, P.C.

(57) ABSTRACT

A tracking apparatus includes a tracking subject setting unit, a tracking subject search unit, an obstructing detection unit, and an obstructing area detection unit. The tracking subject search unit searches for the tracking subject by using at least one of luminance of the image data, color of the image data, a result of face detection, and a result of focus detection. The obstructing detection unit detects that the tracking subject is obstructed by comparing a standard focus detection information with a focus detection information obtained at a tracking position. The obstructing area detection unit detects an obstructing area. The tracking subject search unit exclusively sets a search area around the obstructing area and searches the set search area for the tracking subject by using information different from the result of focus detection, when the obstructing of the tracking subject is detected.

9 Claims, 13 Drawing Sheets

(51) Int. Cl.
*G06K 9/46* (2006.01)
*G06K 9/62* (2006.01)
*G06T 7/20* (2017.01)
*G06T 7/73* (2017.01)
*G06T 7/90* (2017.01)

(52) U.S. Cl.
CPC ......... *G06K 9/4661* (2013.01); *G06K 9/6215* (2013.01); *G06T 7/20* (2013.01); *G06T 7/73* (2017.01); *G06T 7/90* (2017.01); *H04N 5/23212* (2013.01); *H04N 5/23219* (2013.01); *G06K 2009/4666* (2013.01)

(56) References Cited

U.S. PATENT DOCUMENTS

| | | | | |
|---|---|---|---|---|
| 2005/0004759 | A1* | 1/2005 | Siegel | G01S 13/66 701/519 |
| 2005/0031330 | A1* | 2/2005 | Nonaka | G02B 7/34 396/104 |
| 2008/0080739 | A1* | 4/2008 | Muramatsu | G03B 35/18 382/103 |
| 2009/0009606 | A1 | 1/2009 | Takeuchi | |
| 2010/0171836 | A1* | 7/2010 | Matsuno | H04N 5/23212 348/169 |
| 2013/0162839 | A1* | 6/2013 | Yoneyama | H04N 5/23212 348/169 |

FOREIGN PATENT DOCUMENTS

| | | |
|---|---|---|
| JP | 2005-135014 A | 5/2005 |
| JP | 2006311099 A | 11/2006 |
| JP | 5028154 B2 | 9/2012 |
| JP | 2012191354 A | 10/2012 |

OTHER PUBLICATIONS

Zhang, Jianming et al. "Online Multi-Person Tracking by Tracker Hierarchy" Advanced Video and Signal-Based Surveillance (AVSS), 2012 IEEE Ninth International Conference On, IEEE, Sep. 18, 2012. pp. 379-385.

Jiyan, Pan et al. "Robust Occlusion Handling in Object Tracking" Computer Vision and Pattern Recognition, 2007. CVPR '07. IEEE Conference ON. Jun. 1, 2007. pp. 1-8.

International Preliminary Report on Patentability mailed in corresponding International Patent Application No. PCT/JP2014/067941 dated Jan. 14, 2016, consisting of 6 pp. (English translation provided).

International Search Report mailed in corresponding International Patent Application No. PCT/JP2014/067941 dated Aug. 12, 2014, consisting of 3 pp. (English translation provided).

Written Opinion mailed in corresponding International Patent Application No. PCT/JP2014/067941 dated Aug. 12, 2014, consisting of 3 pp.

Office Action mailed in corresponding Japanese Patent Application No. 2013-140934 dated Mar. 31, 2015, consisting of 5 pp. (English translation provided).

Office Action mailed in corresponding Chinese Patent Application No. 201480036142.1 dated Jan. 3, 2017, consisting of 18 pp. (English Translation Provided).

* cited by examiner

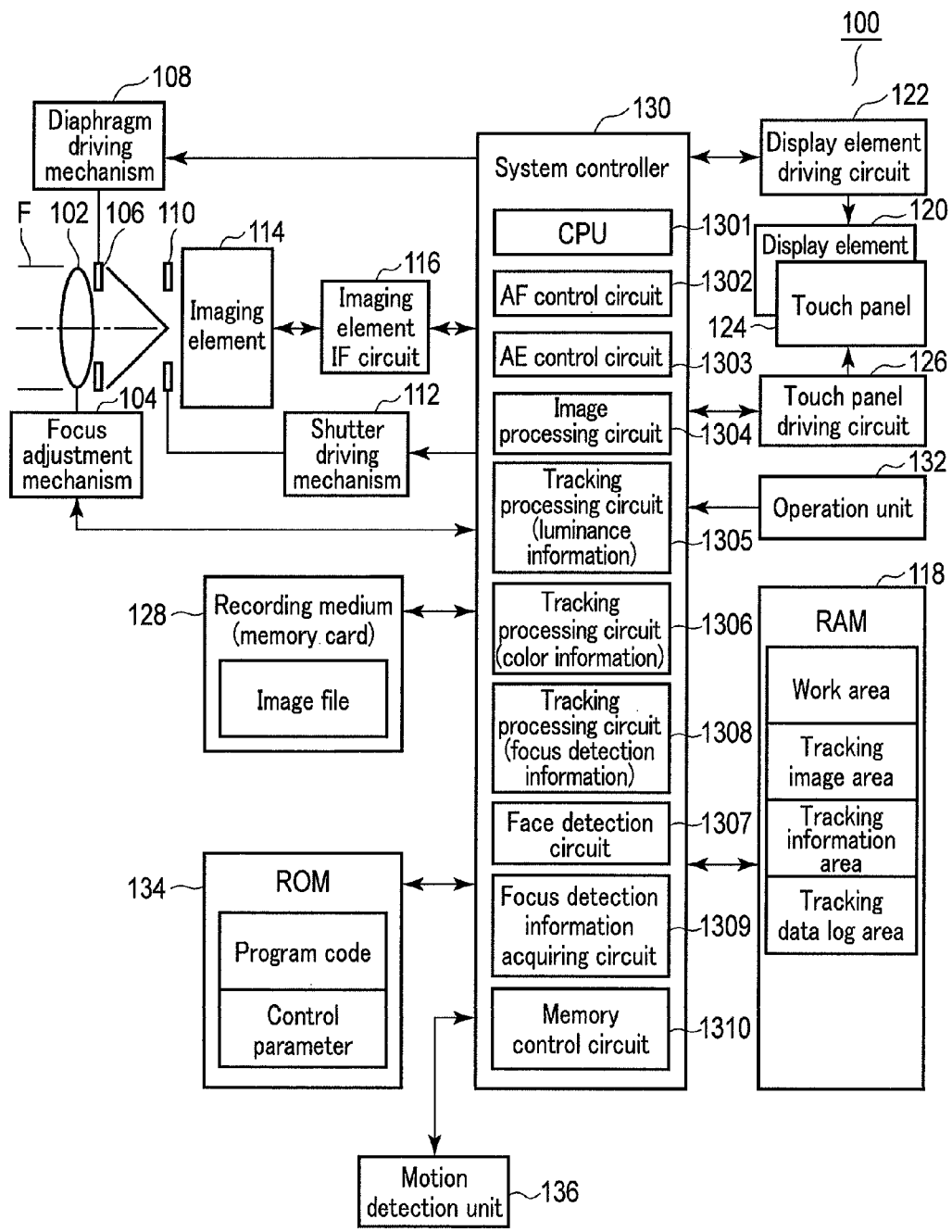
F I G. 1

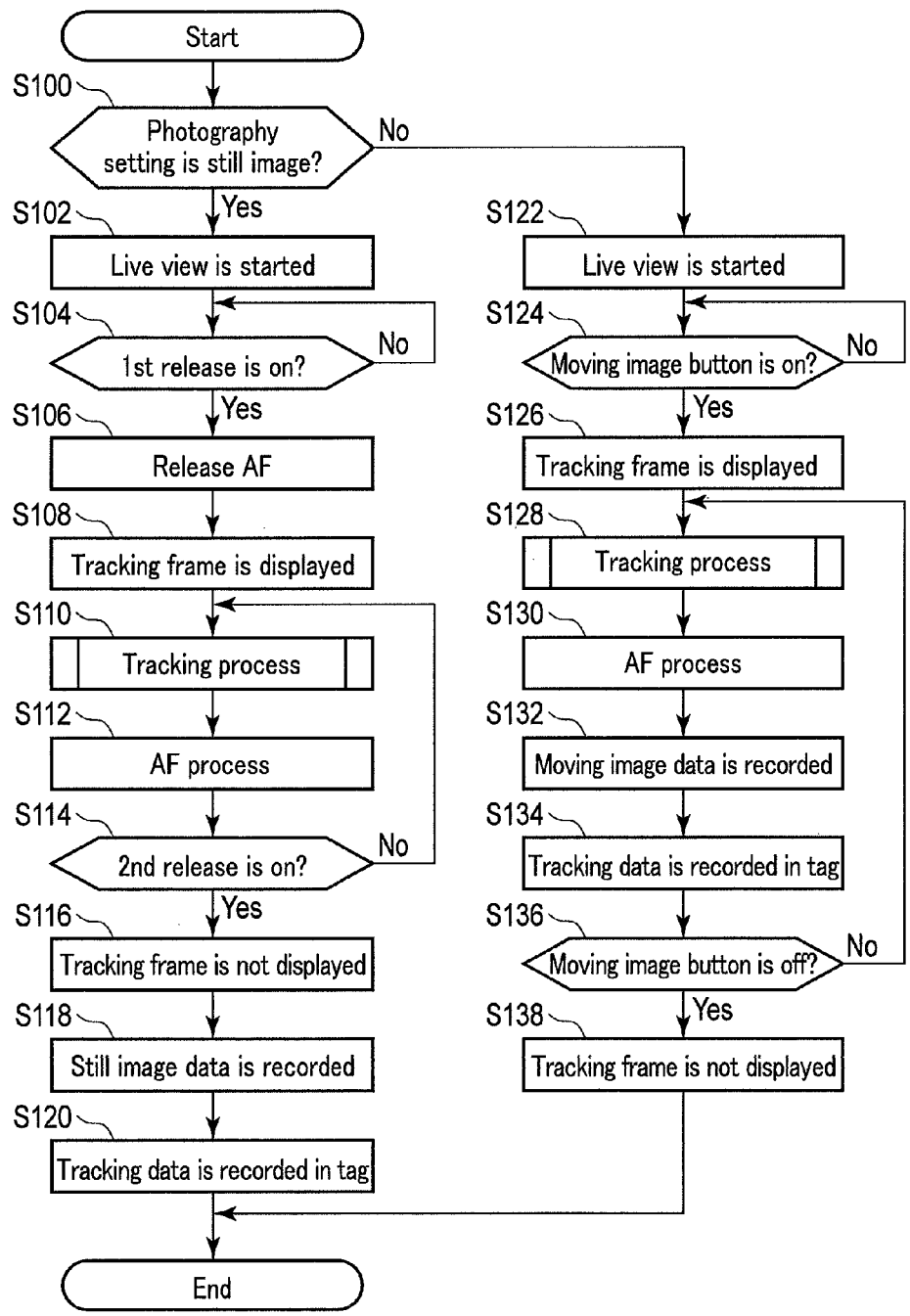
F I G. 8

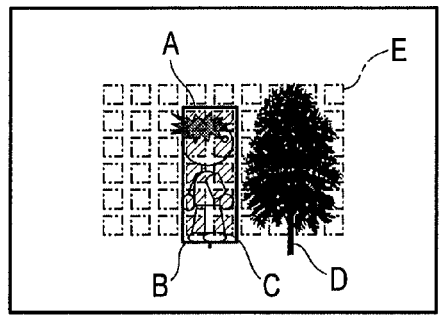
F I G. 13A
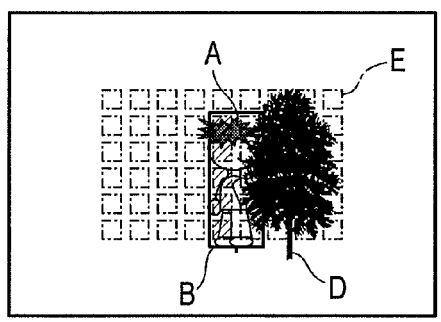
F I G. 13B
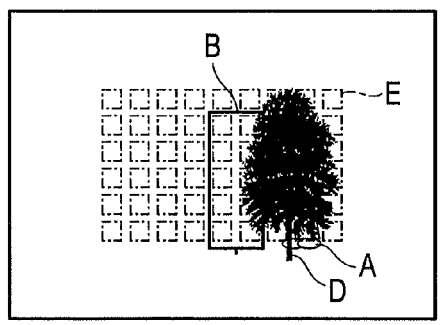
F I G. 13C

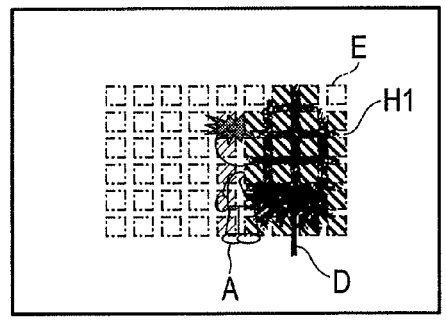
F I G. 16
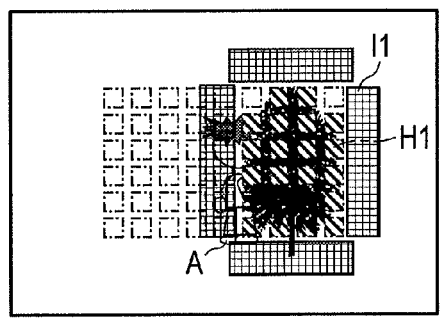
F I G. 17
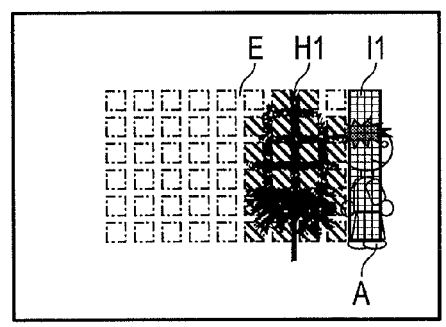
F I G. 18

TRACKING APPARATUS, TRACKING METHOD, AND NON-TRANSITORY STORAGE MEDIUM STORING TRACKING PROGRAM

CROSS-REFERENCE TO RELATED APPLICATIONS

This application is a Continuation application of PCT Application No. PCT/JP2014/067941, filed Jul. 4, 2014 and based upon and claiming the benefit of priority from the prior Japanese Patent Application No. 2013-140934, filed Jul. 4, 2013, the entire contents of both of which are incorporated herein by reference.

BACKGROUND OF THE INVENTION

1. Field of the Invention

The present invention relates to a tracking apparatus which performs a tracking process to track a subject, a tracking method using the tracking apparatus, and a non-transitory storage medium storing a tracking program.

2. Description of the Related Art

Recently, an imaging device which uses some of pixels in an imaging element as focus detection elements for a phase difference AF to detect a focus state has been suggested in, for example, Japanese Patent No. 5028154. According to Japanese Patent No. 5028154, some of the pixels in the imaging element are set as focus detection pixels, and a focus state is detected by detecting a phase difference (defocus amount) of light which has entered the focus detection pixels. Recently, there has been also known a technique for tracking a particular subject in an image using focus detection information such as a defocus amount obtained in focus detection pixels.

BRIEF SUMMARY OF THE INVENTION

A tracking apparatus according to a first aspect of the invention comprises: a tracking subject setting unit which sets a tracking subject in image data obtained by imaging; a tracking subject search unit which searches for the set tracking subject by using at least one of luminance of the image data, color of the image data, a result of face detection, and a result of focus detection; an obstructing detection unit which detects that the tracking subject is obstructed; and an obstructing area detection unit which detects an obstructing area which is obstructing the tracking subject when the obstructing of the tracking subject is detected, wherein the obstructing detection unit detects that the tracking subject is obstructed by comparing a standard focus detection information which is a standard information of the tracking subject with a focus detection information obtained at a tracking position, and wherein the tracking subject search unit exclusively sets a search area around the obstructing area and searches the set search area for the tracking subject by using information different from the result of focus detection, when the obstructing of the tracking subject is detected.

A tracking method according to a second aspect of the invention comprises: setting a tracking subject in image data obtained by imaging; searching for the set tracking subject by using at least one of luminance of the image data, color of the image data, a result of face detection, and a result of focus detection; detecting that the tracking subject is obstructed by comparing a standard focus detection information which is a standard information of the tracking subject with a focus detection information obtained at a tracking position; detecting, from the image data, an obstructing area which is obstructing the tracking subject when the obstructing of the tracking subject is detected; and exclusively setting a search area around the obstructing area and searching the set search area for the tracking subject by using information different from the result of focus detection, when the obstructing of the tracking subject is detected.

A non-transitory storage medium according to a third aspect of the invention stores a tracking program causing a computer to: set a tracking subject in image data obtained by imaging; search for the set tracking subject by using at least one of luminance of the image data, color of the image data, a result of face detection, and a result of focus detection; detect that the tracking subject is obstructed by comparing a standard focus detection information which is a standard information of the tracking subject with a focus detection information obtained at a tracking position; detect, from the image data, an obstructing area which is obstructing the tracking subject when the obstructing of the tracking subject is detected; and exclusively seta search area around the obstructing area and search the set search area for the tracking subject by using information different from the result of focus detection, when the obstructing of the tracking subject is detected.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing a configuration as an example of an imaging device comprising a tracking apparatus according to one embodiment of the present invention;

FIG. 8 is a flowchart showing a photography operation of the imaging device;

FIG. 13A is a first diagram showing how a tracking subject is obstructed during the tracking process;

FIG. 13B is a second diagram showing how the tracking subject is obstructed during the tracking process;

FIG. 13C is a third diagram showing how the tracking subject is obstructed during the tracking process;

FIG. 16 is a diagram showing the obstructing detection process;

FIG. 17 is a diagram showing a search process for the tracking subject when no reappearance of the tracking subject is determined;

FIG. 18 is a diagram showing a search process for the tracking subject when reappearance of the tracking subject is determined;

DETAILED DESCRIPTION OF THE INVENTION

Figure 2:
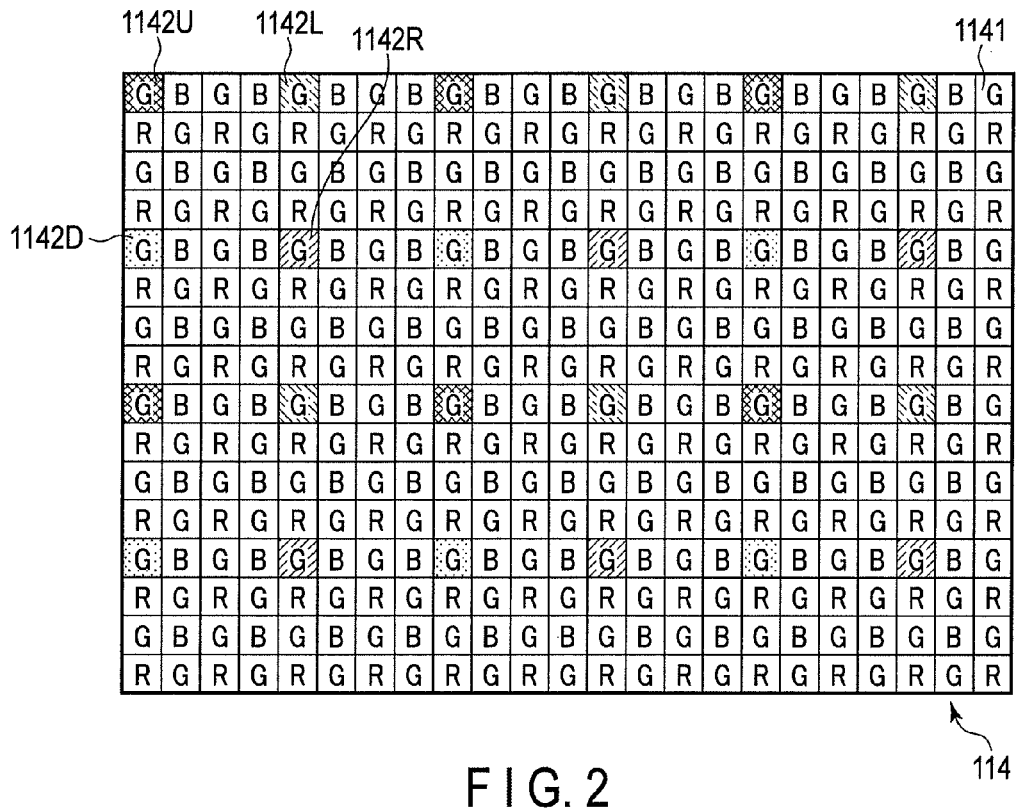
FIG. 2 is a diagram showing focus detection pixels.

Hereinafter, embodiments of the present invention will be described with reference to the drawings.

FIG. 1 shows a diagram showing a configuration as an example of an imaging device comprising a tracking apparatus according to one embodiment of the present invention. The imaging device 100 shown in FIG. 1 comprises a photographic optical system 102, a focus adjustment mechanism 104, a diaphragm 106, a diaphragm driving mechanism 108, a shutter 110, a shutter driving mechanism 112, an imaging element 114, an imaging element interface (IF) circuit 116, a RAM 118, a display element 120, a display element driving circuit 122, a touch panel 124, a touch panel driving circuit 126, a recording medium 128, a system controller 130, an operation unit 132, a ROM 134, and a motion detection unit 136.

The photographic optical system 102 is an optical system which guides a photography light flux F from an unshown subject onto a light receiving surface of the imaging element 114. This photographic optical system 102 includes a plurality of lenses such as a focus lens. The focus adjustment mechanism 104 includes, for example, a motor and a driving circuit for the motor. This focus adjustment mechanism 104 drives the focus lens in the photographic optical system 102 in its optical axis direction (chain line direction shown in the drawing) under the control of a CPU 1301 in the system controller 130.

The diaphragm 106 is configured to open/close, and adjusts the amount of the photography light flux F entering the imaging element 114 via the photographic optical system 102. The diaphragm driving mechanism 108 includes a driving mechanism for driving the diaphragm 106. The diaphragm driving mechanism 108 drives the diaphragm 106 under the control of the CPU 1301 in the system controller 130.

The shutter 110 is configured so that the light receiving surface of the imaging element 114 is shielded from light or exposed to light. The shutter 110 adjusts the exposure time of the imaging element 114. The shutter driving mechanism 112 includes a driving mechanism for driving the shutter 110. The shutter driving mechanism 112 drives the shutter 110 under the control of the CPU 1301 in the system controller 130.

The imaging element 114 includes the light receiving surface on which the photography light flux F from the subject collected via the photographic optical system 102 is formed into an image. The light receiving surface of the imaging element 114 comprises two-dimensionally arranged pixels. A color filter is provided on the light entrance side of the light receiving surface. This imaging element 114 converts the image (subject image) corresponding to the photography light flux F formed on the light receiving surface into an electric signal (hereinafter referred to as an image signal) corresponding to the light amount.

The imaging element IF circuit 116 which functions as an imaging unit together with the photographic optical system 102 and the imaging element 114 drives the imaging element 114 under the control of the CPU 1301 in the system controller 130. The imaging element IF circuit 116 reads the image signal obtained by the imaging element 114 under the control of the CPU 1301 in the system controller 130, and subjects the read image signal to analog processing such as correlated double sampling (CDS) processing and automatic gain control (AGC) processing. The imaging element IF circuit 116 converts the analog-processed image signal into a digital signal (hereinafter referred to as image data).

Here, the imaging element 114 according to the present embodiment is provided with focus detection pixels in some of the pixels. FIG. 2 is a diagram showing the focus detection pixels. In the example shown in FIG. 2, the color filter arrangement in the imaging element 114 is a Bayer arrangement. In the present embodiment, various arrangements of the color filters can be used.

In the case of the Bayer arrangement color filter, horizontal two pixels×vertical two pixels "R", "Gr", "Gb", and "B" are arranged in a horizontal direction and a vertical direction. In the example shown in FIG. 2, the focus detection pixels are disposed in the Gb pixels. The Gb pixels refer to G pixels in a row in which G, B, G, B . . . are alternately disposed.

As shown in FIG. 2, the imaging element 114 comprises an imaging pixel 1141 and focus detection pixels which include a left pupil detection pixel 1142L, a right pupil detection pixel 1142R, an upper pupil detection pixel 1142U, and a lower pupil detection pixel 1142D. The right half region of the left pupil detection pixel 1142L is shielded from light. The left half region of the right pupil detection pixel 1142R is shielded from light. The lower half region of the upper pupil detection pixel 1142U is shielded from light. The upper half region of the lower pupil detection pixel 1142D is shielded from light. In FIG. 2, the corresponding pixel is marked out for each of the pixel configurations of the actual focus detection pixels.

Figure 3:
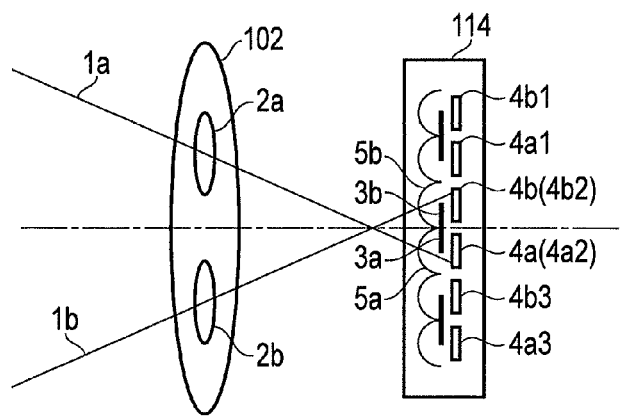
FIG. 3 is a diagram illustrating the principle of phase difference detection using the focus detection pixels.

FIG. 3 is a diagram illustrating the principle of phase difference detection using the focus detection pixels. In FIG. 3, the focus detection pixels are denoted by the reference signs 4a and 4b. The focus detection pixels include a pair comprised of the left pupil detection pixel 1142L and the right pupil detection pixel 1142R, and a pair comprised of the upper pupil detection pixel 1142U and the lower pupil detection pixel 1142D. The focus detection pixel 4a is one of the pair of focus detection pixels, and the focus detection pixel 4b is the other of the pair of focus detection pixels. In the example shown in FIG. 3, the focus detection pixel 4a includes three focus detection pixels, 4a1, 4a2, and 4a3, and the focus detection pixel 4b includes three focus detection pixels, 4b1, 4b2, and 4b3. The numbers of pixels that constitute the focus detection pixel 4a and the focus detection pixel 4b need to be the same, but do not need to be three. The imaging pixel is disposed between the focus detection pixels as shown in FIG. 2, but is not shown in FIG. 3.

Different regions of a light receiving portion are shielded from light by light shielding portions 3a and 3b so that a pair of focus detection pixels can receive light fluxes 1a and 1b emitted from a pair of different pupil regions 2a and 2b of the photographic optical system 102. For example, in the example shown in FIG. 3, the upper region of the light shielding portion in the focus detection pixel 4a is shielded from light, and the lower region is exposed. In contrast, the lower region of the light shielding portion in the focus detection pixel 4b is shielded from light, and the upper region is exposed.

Moreover, microlenses 5a and 5b are disposed on the light receiving side of each pixel. The microlens 5a forms the light flux 1a from the pupil region 2a of the photographic optical system 102 into an image on the focus detection pixel 4a via an opening formed by the light shielding portion 3a. The microlens 5b forms the light flux 1b from the pupil region 2b of the photographic optical system 102 into an image on the focus detection pixel 4b via an opening formed by the light shielding portion 3b.

Figure 4:
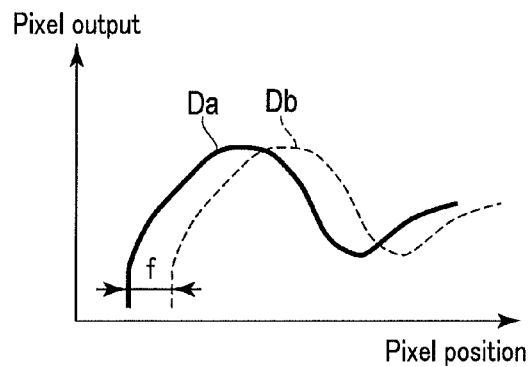
FIG. 4 is a graph showing an example of pixel outputs from the focus detection pixels.

Here, in the following explanation, a pixel output from the focus detection pixel 4a is an a-pixel output, and a pixel output from the focus detection pixel 4b is a b-pixel output. FIG. 4 shows an example of the pixel outputs from the focus detection pixels. In FIG. 4, the a-pixel output which is an output of the pixels 4a1 to 4a3 is denoted by Da, and the b-pixel output which is an output of the pixels 4b1 to 4b3 is denoted by Db. As shown in FIG. 4, a phase difference f is generated between the a-pixel output Da and the b-pixel output Db in the arrangement direction of the pixels. This phase difference f corresponds to a defocus amount of the photographic optical system 102, and the photographic optical system 102 can be brought into focus by calculating the defocus amount. Here, a technique of finding the correlation between the a-pixel output Da and the b-pixel output Db is applicable to a calculation technique of the phase difference f. This technique is a known art and is therefore not described.

The RAM 118 is, for example, an SDRAM, and has a work area, a tracking image area, a tracking information area, and a tracking data log area as storage areas. The work area is a storage area provided in the RAM 118 to temporarily store data generated in each section of the imaging device 100, for example, image data obtained by the imaging element IF circuit 116. The tracking image data is a storage area provided in the RAM 118 to temporarily store image data necessary for tracking. Image data necessary for a tracking process includes evaluation image data and reference image data. The tracking information area is a storage area provided in the RAM 118 to temporarily store tracking information. The tracking information is information used to determine the reappearance of the tracking subject, and is information corresponding to the contents of the tracking process. The tracking data log area is a storage area provided in the RAM 118 to temporarily store a tracking data log. The tracking data log is a log in which positional data for a tracking position obtained as a result of the tracking process is recorded.

The display element 120 is, for example, a liquid crystal display (LCD). The display element 120 displays various images such as images for live view, and images recorded in the recording medium 128. The display element driving circuit 122 drives the LCD 120 in accordance with the image data input from the CPU 1301 of the system controller 130, and displays images on the LCD 120.

The touch panel 124 is integrally formed on a display screen of the LCD 120, and detects, for example, a contact position of the user's finger or the like on the display screen. The touch panel driving circuit 126 drives the touch panel 124, and outputs, to the CPU 1301 of the system controller 130, the contact detection signal from the touch panel 124. The CPU 1301 detects the user's contact operation on the display screen from the contact detection signal, and performs processing corresponding to the contact operation.

The recording medium 128 is, for example, a memory card. An image file obtained by a photography operation is recorded in the recording medium 128. The image file is a file formed by attaching a predetermined header to image data. For example, data indicating a photography condition and data indicating a tracking position are recorded in the header as tag data.

As control circuits which control the operation of the imaging device 100, the system controller 130 includes the CPU 1301, an AF control circuit 1302, an AE control circuit 1303, an image processing circuit 1304, tracking processing circuits 1305, 1306, and 1308, a face detection circuit 1307, a focus detection information acquiring circuit 1309, and a memory control circuit 1310.

The CPU 1301 is a control unit which controls the operation of each of the blocks outside the system controller 130, for example, the focus adjustment mechanism 104, the diaphragm driving mechanism 108, the shutter driving mechanism 112, the display element driving circuit 122, and the touch panel driving circuit 126, and the operation of each of the control circuits inside the system controller 130.

The AF control circuit 1302 detects a focus state in an imaging screen to control AF processing. More specifically, the AF control circuit 1302 evaluates the contrast of image data in accordance with an AF evaluation value as focus detection information acquired by the focus detection information acquiring circuit 1309, and at the same time, controls the focus adjustment mechanism 104, and thereby brings the focus lens into focus. The AF control circuit 1302 also controls the focus adjustment mechanism 104 in accordance with a defocus amount as focus detection information acquired by the focus detection information acquiring circuit 1309, and thereby brings the focus lens into focus.

The AE control circuit 1303 controls AE processing. More specifically, the AE control circuit 1303 calculates subject luminance by using the image data obtained by the imaging element IF circuit 116. In accordance with the subject luminance, the CPU 1301 calculates, for example, an opening amount (aperture value) of the diaphragm 106 during exposure, a release time (shutter speed value) of the shutter 110, imaging element sensitivity, and ISO sensitivity.

The image processing circuit 1304 performs various kinds of image processing for the image data. The image processing includes, for example, color correction processing, gamma (γ) correction processing, and compression processing. The image processing circuit 1304 also expands compressed image data.

Figure 5A:
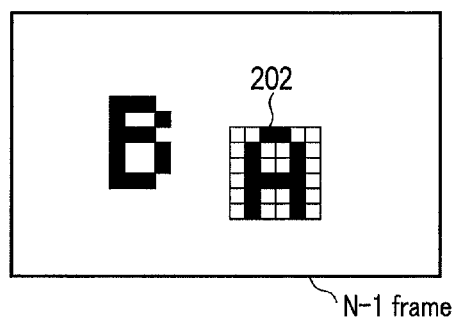
FIG. 5A is a first diagram illustrating a tracking process that uses luminance information.

The tracking processing circuit 1305 performs a tracking process to search for the tracking subject by using the luminance information in the image data. Here, the tracking process that uses the luminance information is briefly described. In the tracking process that uses the luminance information, for example, if the tracking target is set in the (N−1) frame shown in FIG. 5A, image data for a predetermined region 202 including the tracking target in the (N−1) frame is stored in the tracking image area of the RAM 118 as evaluation image data. In the subsequent tracking process, a part of the reference image data corresponding to evaluation image data 202 is searched for.

Figure 5B:
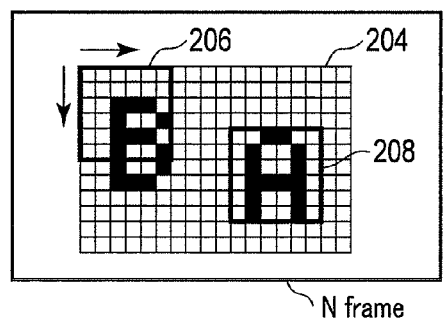
FIG. 5B is a second diagram illustrating the tracking process that uses the luminance information.

The tracking process of the N frame is described by way of example. First, the image data for the N frame is stored in the tracking image area of the RAM 118 as reference image data. An image correlation degree between image data in a predetermined search range 204 of the reference image data and the evaluation image data 202 is found, and a part of the reference image data corresponding to the evaluation image data 202 is thereby searched for. The image correlation degree is determined, for example, from a sum of absolute differences (the accumulation of absolute values of luminance differences found for the respective pixels) between the evaluation image data and the reference image data. For example, if the sum of absolute differences between the reference image data in an area 206 of the reference image data shown in FIG. 5B and the evaluation image data 202 is found, the area 206 of the reference image data and the evaluation image data 202 are obviously different image data, so that the sum of absolute differences is great. In contrast, if the sum of absolute differences between an area 208 of the reference image data and the evaluation image data 202 is found, the sum of absolute differences is small. Thus, the sum of absolute differences is smaller when the image correlation degree between the reference image data and the evaluation image data 202 is greater. In the tracking process that uses the luminance information, the reference image data is searched for an area having the maximum image correlation degree, that is, the minimum value of the sum of absolute differences. In the example shown in FIG. 5B, this area is the area 208. In the tracking position log area, a position having the highest correspondence in the area 208 is recorded as a tracking position. If there is more than one such position, for example, a position close to the center of the area 208 is used as the tracking position. In the next tracking process, this tracking position is preferably the start position of the tracking process. Thus, the time required for the tracking process can be reduced.

Figure 6A:
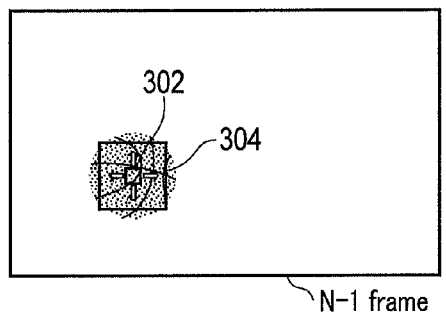
FIG. 6A is a first diagram illustrating a tracking process that uses color information.

The tracking processing circuit 1306 performs a tracking process to search for the tracking subject by using color information in the image data. Here, the tracking process that uses the color information is briefly described. In the tracking process that uses the color information, a similar color area which is an area that can be determined to have the same color as the color set in the evaluation image data is searched for. For example, when a position 302 where the subject is located is specified in the (N−1) frame as shown in FIG. 6A, image data including this position 302 is determined as the evaluation image data, and the color information at the position 302 of the evaluation image data is acquired. The position 302 having color information which is most similar to the color information acquired from the evaluation image data in the reference image data is used as the start position of the tracking process to search for an area having the same color information as the position 302. More specifically, the color information is sequentially acquired at the position 302 from the start position to the periphery. If the acquired color information can be determined to be the same as the color information at the position 302, the position 302 is included in the tracking color area. If the acquired color information cannot be determined to be the same as the color information at the position 302, the position 302 is not included in the tracking color area. As a result of the search for the similar color area in this way, a rectangular area 304 inscribed in the subject is the similar color area, for example, when the subject has a single color as shown in FIG. 6A. The tracking position to be recorded in the tracking data log area is, for example, the gravity center position of the similar color area 304 (which is the same as the position 302 in the example shown in FIG. 6A). In the next tracking process, this tracking position is used as the start position of the tracking process.

Figure 6B:
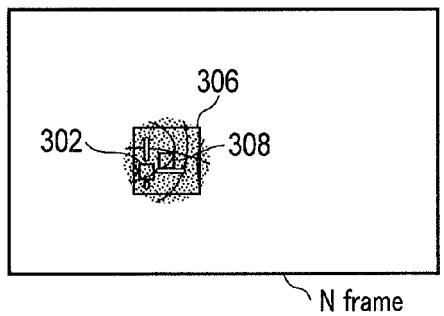
FIG. 6B is a second diagram illustrating the tracking process that uses the color information.

The tracking process of the N frame is shown by way of example. The tracking position 302 of the (N−1) frame is used as the start position of the tracking process, in a predetermined search area of the image data of the N frame stored as the reference image data shown in FIG. 6B. The periphery of the tracking position 302 is sequentially searched for, as similar color areas, areas which can be determined to have the same color as the color of the similar color area 304. In the example shown in FIG. 6B, an area 306 is the similar color area. A center of gravity position 308 of the area 306 which is the found similar color area is set as a tracking position and then recorded in the tracking data log area.

Figure 7A:
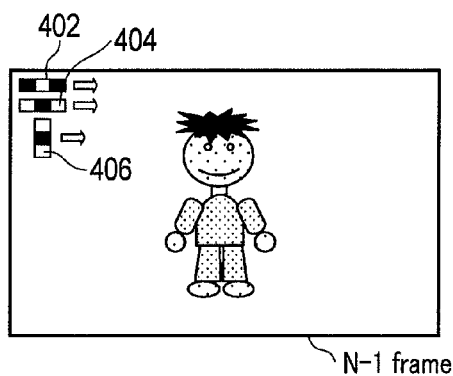
FIG. 7A is a first diagram illustrating a tracking process that uses face detection.
Figure 7B:
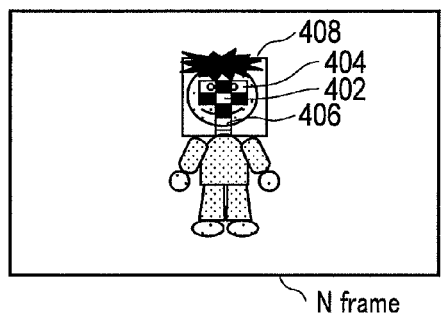
FIG. 7B is a second diagram illustrating the tracking process that uses the face detection.

The face detection circuit 1307 detects the face of the subject (person) in the image data. Here, the tracking process that uses a face detecting process is briefly described. In the face detecting process, the image correlation degree between image data obtained in each frame and, for example, each of face parts 402, 404, and 406 shown in FIG. 7A is found. The face part 402 is image data corresponding to a shade pattern around the nose of the person. The face part 404 is image data corresponding to a shade pattern around the eyes of the person. The face part 406 is image data corresponding to a shade pattern around the mouth of the person. The image correlation degree between the image data and each of the face parts 402, 404, and 406 is the highest in the case of a predetermined arrangement that indicates the face of the person shown in FIG. 7B. In this instance, the face is present in an area 408 including the face parts 402, 404, and 406. The face parts 402, 404, and 406 may be changed in size in accordance with the size of a preset search face. Although the face area is a rectangular area in FIG. 7B, the face area may be a circular area.

The tracking processing circuit 1308 which functions as an example of a tracking processing device has functions as a tracking subject setting unit and a tracking subject search unit. The tracking processing circuit 1308 performs a track process to search for a tracking subject using the focus detection information acquired by the focus detection information acquiring circuit 1309. For example, it is possible to determine whether the subject in the image data is far or near by evaluating the level of the contrast of the image data using the AF evaluation value. Therefore, it is possible to track the tracking subject by searching all the focus detection areas for the focus detection information for the tracking subject. The tracking processing circuit 1308 also has functions as an obstructing detection unit and an obstructing area detection unit. The tracking processing circuit 1308 detects that the tracking subject is obstructed from the change of the focus detection information for the tracking subject, and detects the area of the image data in which an obstacle obstructing the tracking subject is located when the tracking subject is obstructed. A subject distance calculated not on the basis of the contrast of the image data but on the basis of the defocus amount detected in phase difference detection pixels may be used for the tracking processing and for the detection of the obstacle.

The focus detection information acquiring circuit 1309 acquires focus detection information in the imaging screen. For example, the focus detection information acquiring circuit 1309 extracts high-frequency components in the focus detection area set in the image data input via the imaging element 114, and accumulates the extracted high-frequency components to acquire an AF evaluation value as an example of focus detection information. The focus detection information acquiring circuit 1309 also calculates a defocus amount as an example of focus detection information from the image data input from the focus detection pixels of the imaging element 114.

The memory control circuit 1310 is an interface for, for example, the CPU 1301 to perform control to access the RAM 118, the recording medium 128, and the ROM 134.

The operation unit 132 includes various operation members to be operated by the user. For example, the operation unit 132 includes a release button, a moving image button, a mode button, a selection key, and a power supply button. The release button is an operation member to issue an instruction for still image photography. The release button includes a 1st release switch and a 2nd release switch. The 1st release switch is a switch which is turned on when the user presses the release button halfway. When the 1st release switch is turned on, a photographic preparation operation such as an AF process is performed. The 2nd release switch is a switch which is turned on when the user fully presses the release button. When the 2nd release switch is turned on, an exposure operation for still image photography is performed. The moving image button is an operation member for issuing an instruction for moving image photography. If the moving image button is operated, the moving image photography is started. If the moving image button is then pressed again, the moving image photography is ended. The mode button is an operation member for selecting a photography setting of the imaging device 100. The selection key is an operation member for selecting or deciding an item, for example, on a menu screen. If the selection key is operated by the user, an item is selected or deciding on the menu screen. The power supply button is an operation member for turning on or off the power supply of the imaging device. If the power supply button is operated by the user, the imaging device 100 is activated and becomes operable. If the power supply button is operated while the imaging device 100 is active, the imaging device 100 is set to a power saving standby state.

A program code for the CPU 1301 to perform various kinds of processing is stored in the ROM 134. Various control parameters are also stored in the ROM 134, such as control parameters necessary for the operations of the photographic optical system 102, the diaphragm 106, and the imaging element 114, and control parameters necessary for image processing in the image processing circuit 1304. In the ROM 134, for example, data regarding face parts used in the face detection in the face detection circuit 1307, and data for displaying a tracking frame are also stored.

The motion detection unit 136 is, for example, a gyrosensor, and detects the motion of the imaging device 100.

Now, the operation of the imaging device according to the present embodiment is described. FIG. 8 is a flowchart showing a photography operation of the imaging device. The CPU 1301 reads a necessary program code from the ROM 134 to control the operation in FIG. 8.

In S100, the CPU 1301 determines whether the current photography setting of the imaging device 100 is the still image photography mode. As described above, the photography setting is set by the mode button. When the photography setting is determined to be the still image photography mode in S100, the CPU 1301 starts a live view operation in S102. The live view operation is as follows. The CPU 1301 controls the shutter driving mechanism 112 to open the shutter 110, and then controls the imaging element IF circuit 116 to start the imaging by the imaging element 114. The CPU 1301 then inputs, to the image processing circuit 1304, the image data which has been stored in the work area of the RAM 118 as the result of the imaging by the imaging element 114 so that the image data is subjected to image processing for live view display. The CPU 1301 then inputs, to the display element driving circuit 122, the image data which has been subjected to the image processing for the live view display, and displays an image on the display element 120. The CPU 1301 displays moving images of the subject by repeating the above-described display operation. The user can observe the subject by the moving image display.

In S104, the CPU 1301 determines whether the 1st release switch has been turned on. The CPU 1301 continues the live view operation until determining that the 1st release switch is turned on in S104. When it is determined in S104 that the 1st release switch has been turned on, the CPU 1301 performs a release AF process in S106. In the release AF, the CPU 1301 drives the focus lens to an in-focus position by scan drive. In the scan drive, the CPU 1301 controls the focus adjustment mechanism 104 to drive the focus lens in one direction within a predetermined scan range, and at the same time, evaluates AF evaluation values sequentially calculated by the AF control circuit 1302. The CPU 1301 stops the driving of the focus lens at a lens position where contrast is maximized as a result of the evaluation of the AF evaluation values. Such scan drive is performed when there is a great difference between the position of the focus lens before AF and the in-focus position. In S106, a phase difference AF process may be performed instead of the release AF process.

In S108, the CPU 1301 controls the display element driving circuit 122 to display a tracking frame on the display element 120. The tracking frame is displayed at the position of the tracking subject on the screen of the display element 120. For example, the subject brought into focus by the release AF may be set as a tracking subject, and the tracking frame may be displayed on this tracking subject. When a face is detected by the face detection circuit 1307, the tracking frame may be displayed on this face. When the subject displayed on the screen of the display element 120 is specified by the touch panel 124, the tracking frame may be displayed on this subject. After the tracking frame is displayed, the tracking processing circuit sets the subject in the tracking frame as a tracking subject. This operation corresponds to the operation of the tracking subject setting unit.

In S110, the CPU 1301 performs a tracking process by various tracking processing circuits. It is set in advance of the tracking process whether to perform a tracking process that uses the luminance information, a tracking process that uses the color information, a tracking process that uses the face detection, or a tracking process that uses the focus detection information. More than one tracking process may be used in combination. Details of the tracking processes will be described later.

In S112, the CPU 1301 performs an AF process by the AF control circuit 1302 to bring the tracking subject into focus. In the AF process after the tracking process, the focus lens is driven to the in-focus position by the scan drive or wobbling drive. In the wobbling drive, the CPU 1301 determines whether the AF evaluation value calculated by the AF control circuit 1302 when the focus lens is driven has increased as compared with the AF evaluation value at the previous lens position. When the AF evaluation value has increased, the CPU 1301 slightly drives the focus lens in the same direction as the previous direction. When the AF evaluation value has decreased, the CPU 1301 slightly drives the focus lens in a direction opposite to the previous direction. The CPU 1301 rapidly repeats such an operation to gradually drive the focus lens to the in-focus position. In S112, the phase difference AF process may be performed instead of the contrast AF process.

In S114, the CPU 1301 determines whether the 2nd release switch has been turned on. When it is determined in S114 that the 2nd release switch has not been turned on, the CPU 1301 performs processes after the tracking process in S110. Thus, in the still image photography mode, the tracking process is continued until the 2nd release switch is turned on. When it is determined in S114 that the 2nd release switch is turned on, the CPU 1301 controls the display element driving circuit 122 so that the tracking frame is not displayed, in S116.

In S118, the CPU 1301 performs a process to record still image data in the recording medium 128. In this instance, the CPU 1301 controls the shutter driving mechanism 112 to close the shutter 110. The CPU 1301 then controls the diaphragm driving mechanism 108 to narrow the diaphragm 106. The CPU 1301 then controls the shutter driving mechanism 112 to release the shutter 110 for a predetermined release time, and at the same time, performs imaging (exposure) by the imaging element 114. The CPU 1301 then processes, in the image processing circuit 1304, the still image data obtained via the imaging element 114. The CPU 1301 adds a header to the still image data processed in the image processing circuit 1304 to generate a still image file, and records the generated still image file in the recording medium 128. In S120, the CPU 1301 additionally writes data that indicates the tracking position obtained as a result of the tracking process in S110 into the still image file previously recorded in the recording medium 128. The CPU 1301 then ends the operation shown in FIG. 8.

When the photography setting is determined to be the moving image photography mode in S100, the CPU 1301 starts the live view operation in S122. In S124, the CPU 1301 determines whether the moving image button is turned on. The CPU 1301 continues the live view operation until determining that the moving image button is turned on in S124. When it is determined in S124 that the moving image button is turned on, the CPU 1301 controls the display element driving circuit 122 in S126 so that the tracking frame is displayed on the display element 120. The CPU 1301 then performs a tracking process in S128. Details of the tracking process will be described later. In S130, the CPU 1301 performs an AF process by the AF control circuit 1302 to bring the subject at the tracking position into focus.

In S132, the CPU 1301 performs a process to record moving image data in the recording medium 128. In this instance, the CPU 1301 controls the diaphragm driving mechanism 108 to narrow the diaphragm 106 to the aperture value calculated in the AE process. The CPU 1301 then causes the imaging element 114 to perform imaging (exposure) for a time corresponding to the shutter speed value calculated in the AE process. After the end of the exposure, the CPU 1301 generates a moving image file and records the moving image file in the recording medium 128. The CPU 1301 processes, in the image processing circuit 1304, the moving image data obtained via the imaging element 114, and records, in the moving image file, the moving image data processed in the image processing circuit 1304. In S134, the CPU 1301 records data that indicates the tracking position obtained as a result of the tracking process in S128 simultaneously with the moving image file previously recorded in the recording medium 128.

In S136, the CPU 1301 determines whether the moving image button has been turned off. When it is determined in S136 that the moving image button has not been turned off, the CPU 1301 performs processes after the tracking process in S128. Thus, in the moving image photography mode, the tracking process and the recording of the moving image data are continued until the moving image button is turned off. When it is determined in S136 that the moving image button has been turned off, the CPU 1301 controls the display element driving circuit 122 in S138 so that the tracking frame is not displayed. The CPU 1301 then ends the operation shown in FIG. 8.

Figure 9:
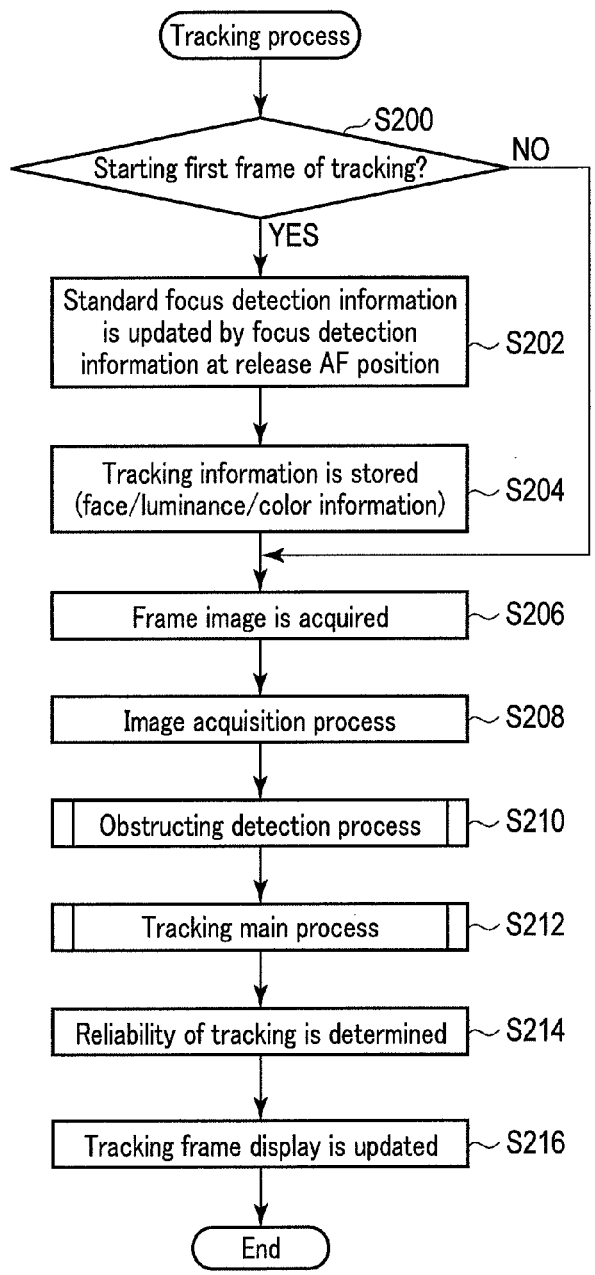
FIG. 9 is a flowchart showing the tracking process.

Now, the tracking process according to the present embodiment is described. FIG. 9 is a flowchart showing the tracking process. Here, the process in FIG. 9 is the tracking process that uses the focus detection information, and is mainly performed by the tracking processing circuit 1308. The tracking process that uses the face detection, the tracking process that uses the luminance information, and the tracking process that uses the color information may be used together.

In S200, the tracking processing circuit 1308 determines whether the present is the starting first frame of the tracking process. When it is determined in step S200 that the present is the starting first frame of the tracking process, the tracking processing circuit 1308 updates standard focus detection information using the focus detection information obtained at the time of the release AF, in S202. Here, the standard focus detection information is the focus detection information to be the determination standard for determining whether the tracking subject is obstructing the obstacle. In the first frame, the result of the release AF is used as the standard focus detection information. When a tracking subject is directly specified by the user, focus detection information for this tracking subject may be used as the standard focus detection information.

In S204, the tracking processing circuit 1308 stores tracking information. The tracking information here is information other than the focus detection information that can be used in the tracking process. For example, organ information for the face of the tracking subject (the positional relation between the eyes, the nose, and the mouth), luminance information for the region of the tracking subject, and color information for the region of the tracking subject are stored as the tracking information. More than one kind of tracking information may be stored.

In S206, the tracking processing circuit 1308 controls the imaging element IF circuit 116 to perform imaging by the imaging element 114. In S208, the tracking processing circuit 1308 loads, into the RAM 118, image data obtained in the imaging element IF circuit 116 by the imaging with the imaging element 114.

In S210, the tracking processing circuit 1308 performs an obstruction detection process. The obstructing detection process is a process to detect an obstacle that is obstructing the tracking subject. The obstructing detection process will be described in detail later. In S210, the tracking processing circuit 1308 performs a tracking main process. The tracking main process is a process to track the tracking subject using the result of the obstructing detection process. The tracking main process will be described in detail later.

In S214, the tracking processing circuit 1308 determines the reliability of a tracking position. The reliability of the tracking position is determined from the focus detection information. For example, it is determined that the tracking position is reliable when the AF evaluation value is higher than a predetermined value.

In S216, the tracking processing circuit 1308 controls the display element driving circuit 122 to update the display position of the tracking frame to a position corresponding to the tracking position decided in the tracking main process. The tracking processing circuit 1308 then ends the tracking process in FIG. 9. However, when it is determined in S214 that the reliability is low, the display position of the tracking frame does not need to be updated.

Figure 10:
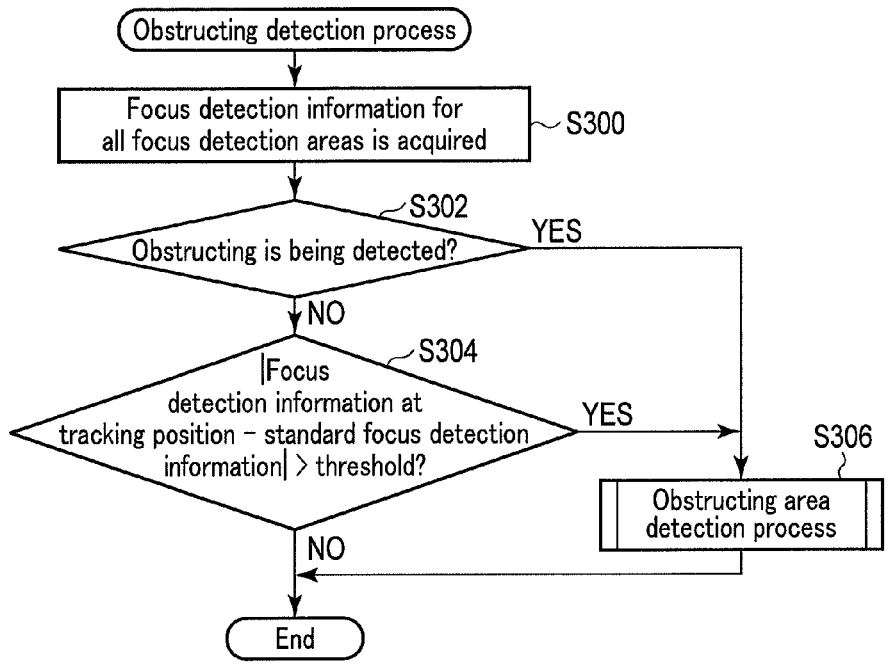
FIG. 10 is a flowchart showing an obstructing detection process.

FIG. 10 is a flowchart showing the obstructing detection process. In S300, the tracking processing circuit 1308 acquires focus detection information (e.g., AF evaluation values) for all the focus detection areas obtained in the focus detection information acquiring circuit 1309. In S302, the tracking processing circuit 1308 determines whether obstructing of the tracking subject is detected at present. In the starting first frame of the tracking process, it is always determined that no obstructing of the tracking subject is detected.

When it is determined in S302 that no obstructing of the tracking subject is detected, the tracking processing circuit 1308 determines in S304 whether an absolute difference value between the focus detection information at the tracking position and the standard focus detection information is higher than a threshold. When it is determined in S304 that the absolute difference value between the focus detection information at the tracking position and the standard focus detection information is not higher than the threshold, the tracking processing circuit 1308 detects that the tracking subject is not obstructed. In this instance, the tracking processing circuit 1308 ends the process in FIG. 10. When it is determined in S302 that obstructing of the tracking subject is detected or when it is determined in S304 that the absolute difference value between the focus detection information at the tracking position and the standard focus detection information is higher than the threshold, the tracking processing circuit 1308 detects that the tracking subject is obstructed. In this instance, the tracking processing circuit 1308 performs an obstructing area detection process in S306. The tracking processing circuit 1308 then ends the process in FIG. 10. The obstructing area detection process is a process to detect, from the image data, an obstructing area which is obstructing the tracking subject.

Figure 11:
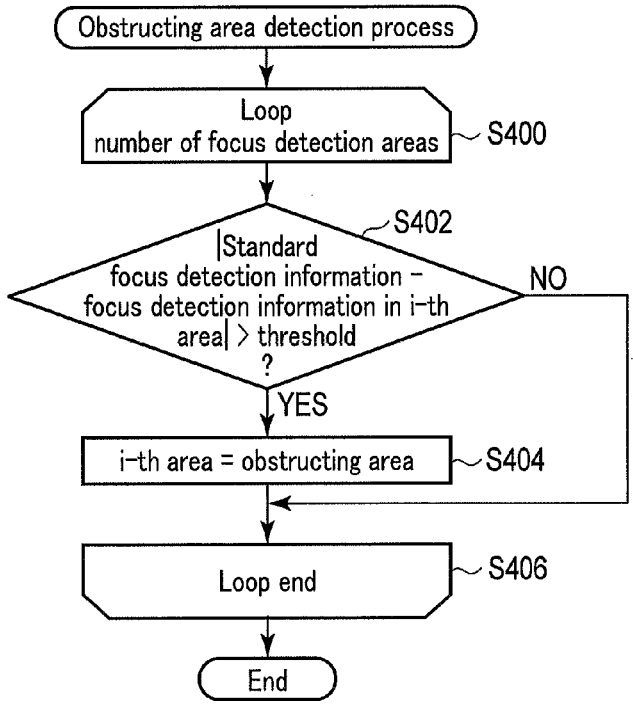
FIG. 11 is a flowchart showing an obstructing area detection process.

FIG. 11 is a flowchart showing the obstructing area detection process. In S400, the tracking processing circuit 1308 sets various parameters for a loop process. i indicates the number of a focus detection area. The initial value of i is 1 (e.g., the upper left focus detection area), and the maximum value of i is the number of focus detection areas. i is incremented whenever the process up to step S404 ends.

In S402, the tracking processing circuit 1308 determines whether an absolute difference value between the standard focus detection information and the focus detection information in the i-th focus detection area is higher than a threshold. When it is determined in S402 that the absolute difference value between the standard focus detection information and the focus detection information in the i-th focus detection area is not higher than the threshold, the tracking processing circuit 1308 advances the process to step S406. When it is determined in S402 that the absolute difference value between the standard focus detection information and the focus detection information in the i-th focus detection area is higher than the threshold, the tracking processing circuit 1308 includes the i-th area in the obstructing area in S404. As another detection process of an obstructing area, for example, an area which is adjacent to the position where an obstacle is estimated to exist (a tracking position immediately before the obstructing area detection process is performed) and which has the same color information or luminance information as the obstacle position may be included in the obstructing area.

In S406, the tracking processing circuit 1308 determines whether the obstructing area detection process is performed for all the focus detection areas, as the determination of the end of the loop process. When it is determined that the obstructing area detection process has not been performed for all the focus detection areas, the tracking processing circuit 1308 continues the loop process. When it is determined that the obstructing area detection process has been performed for all the focus detection areas, the tracking processing circuit 1308 ends the tracking process in FIG. 11.

Figure 12:
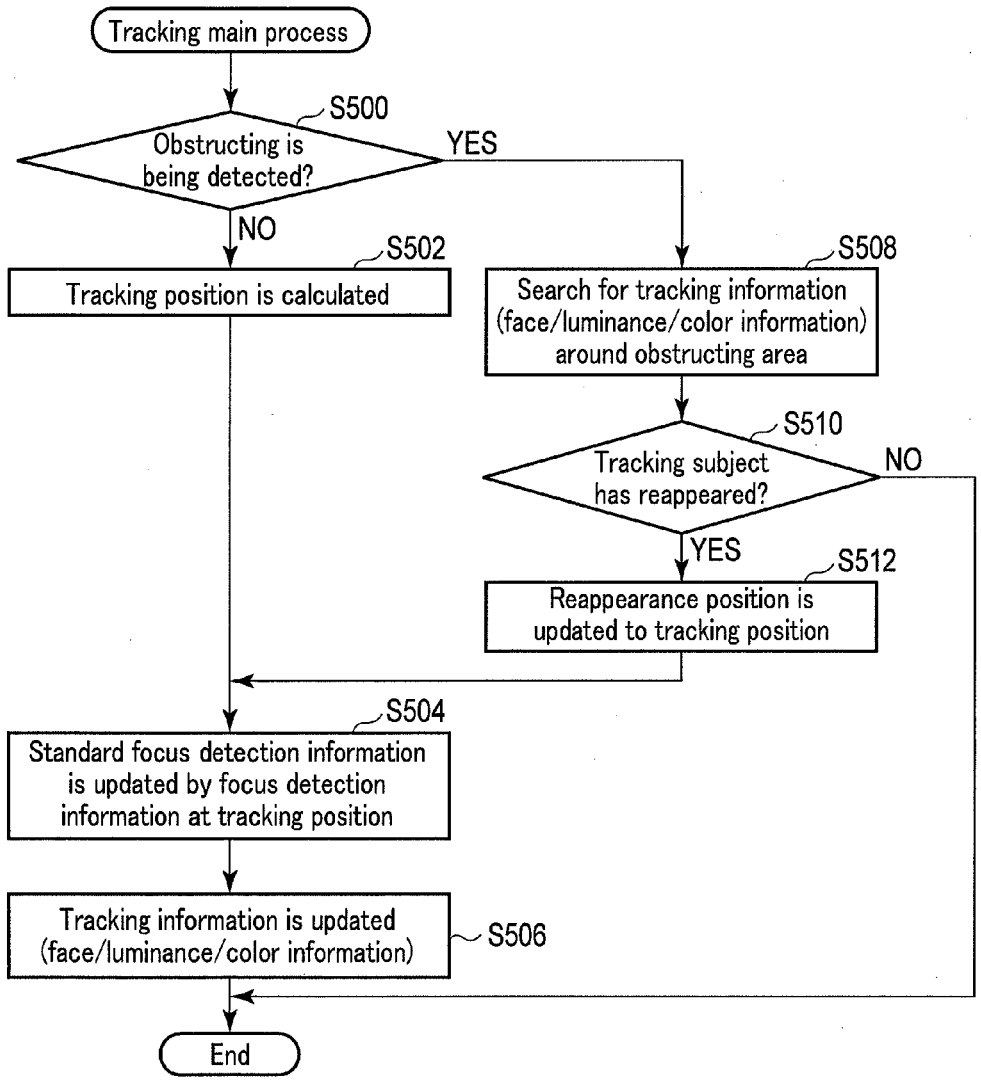
FIG. 12 is a flowchart showing a tracking main process.

FIG. 12 is a flowchart showing the tracking main process. In S500, the tracking processing circuit 1308 determines whether obstructing of the tracking subject is detected at present. When it is determined in S500 that obstructing of the tracking subject is detected, the tracking processing circuit 1308 calculates a tracking position using the focus detection information in S502. The above-mentioned calculation method is used as a specific method of the tracking position.

In S504, the tracking processing circuit 1308 updates the standard focus detection information using the focus detection information at the calculated tracking position. By updating the standard focus detection information, it is possible to correctly perform the obstructing detection process even when the tracking subject moves. In S506, the tracking processing circuit 1308 updates the tracking information to the current tracking information. The tracking processing circuit 1308 then ends the process in FIG. 12.

When it is determined in S500 that obstructing of the tracking subject is detected, the tracking processing circuit 1308 sets a search area around the obstructing area, and searches the search area for tracking information (the position of the face, the luminance information, or the color information) similar to the previously stored tracking information, in S508. The search area is, for example, an area disposed adjacent to the obstructing area around the obstructing area.

In S510, the tracking processing circuit 1308 determines whether the obstructed tracking subject has reappeared. For example, when the face of the tracking subject is again detected in the search area, or when the luminance information for a pattern (arrangement) similar to that of the tracking subject is again detected in the search area, or when the color information for a pattern similar to that of tracking subject is again detected, it is determined that the tracking subject has reappeared. When it is determined in S510 that the obstructed tracking subject has not reappeared, that is, the tracking subject is still obstructed, the tracking processing circuit 1308 ends the process in FIG. 12. When it is determined in S510 that the obstructed tracking subject has reappeared, the tracking processing circuit 1308 updates the tracking information to the reappearance position in S512. The tracking processing circuit 1308 then shifts the process to S504.

Figure 13D:
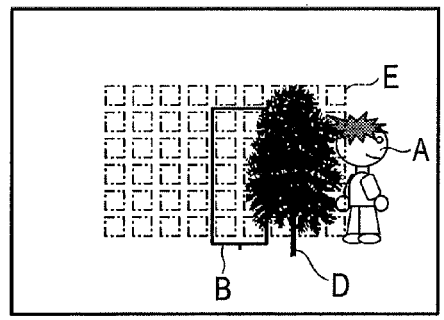
FIG. 13D is a fourth diagram showing how the tracking subject is obstructed during the tracking process.

The operation of the image processing according to the present embodiment is further described. For example, the subject A shown in FIG. 13A is set as a tracking subject. In this instance, a tracking frame B is displayed around the tracking subject A. When the tracking subject A is not obstructed by an obstacle D as shown in FIG. 13A, it is possible to track the tracking subject A using focus detection information for a focus detection area C. In contrast, if the tracking subject A is obstructed by the obstacle D as shown in FIG. 13B or FIG. 13C, focus detection information to be obtained in the focus detection area C is not the focus detection information for the tracking subject A but the focus detection information for the obstacle D. In this instance, as shown in FIG. 13D, a transfer of tracking positions occurs, and there is a possibility that the tracking subject A may not be correctly tracked.

Figure 14:
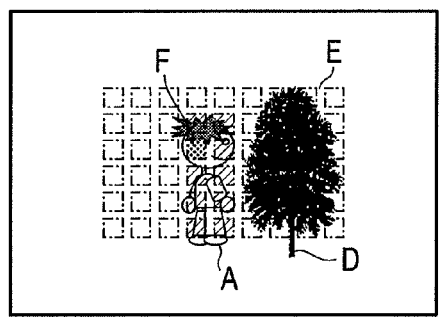
FIG. 14 is a diagram showing how an in-focus position is obtained by release AF.
Figure 15:
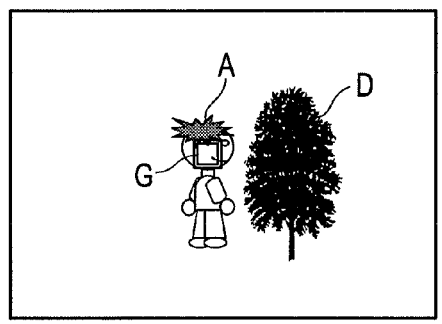
FIG. 15 is a diagram showing tracking information acquired in accordance with the in-focus position.

In the present embodiment, the subject which has been brought into focus, for example, by the release AF is set as a tracking subject. For example, the position of F in FIG. 14 is the in-focus position by the release AF. In this instance, the focus detection information (e.g., an AF evaluation value) at the in-focus position F is acquired as the standard focus detection information in the starting first frame of the tracking process. Moreover, the tracking subject A is set on the basis of the in-focus position F, and the tracking information at a tracking position (the center of the face in the example of FIG. 15) G set in the tracking subject A is acquired as shown in FIG. 15.

In the obstructing detection process, whether an absolute difference value between the focus detection information at the present tracking position and the standard focus detection information is higher than a threshold is determined. When the tracking position (the center of the face) is obstructed as in FIG. 16, the focus detection information at the tracking position indicates a distance shorter than the distance to be originally obtained. In this instance, it is detected that the difference between the focus detection information at the tracking position and the standard focus detection information is higher than the threshold, that is, the tracking subject A is obstructed. If the obstructing of the tracking subject A is detected, the obstructing area detection process is performed. In the obstructing area detection process, an obstructing area H1 is detected by detecting, from the image data, an area in which the difference between the standard focus detection information and the focus detection information in each focus detection area is higher than the threshold, that is, an area in which a subject exists at a shorter distance than the tracking subject.

If the obstructing area H1 is detected, a search area I1 is searched for the tracking information as shown in FIG. 17. The search area I1 in the example shown in FIG. 17 is a rectangular area which is horizontally and vertically adjacent to the obstructing area H1. Here, in the case of the obstructing area detection process according to the present embodiment, the obstructing area H1 is in a focus detection area E. In contrast, as shown in FIG. 17, the search area I1 does not always need to be in the focus detection area E.

FIG. 17 shows an example in which a face cannot be fully detected. In this case, it is determined in S510 that the tracking subject has not reappeared. On the other hand, in FIG. 18, it is determined that the pattern of the face can be fully detected and the tracking subject has reappeared. In this instance, the tracking position is updated to the reappearance position of the tracking subject A. Therefore, the tracking process of the tracking subject A can be continued.

As described above, according to the present embodiment, when obstructing of the tracking subject is detected in the case where the tracking process is performed by use of the focus detection information, the areas around the position where the obstructing is detected are exclusively searched for the tracking information for the tracking subject. The tracking process is normally repeated at short intervals, so that when the obstructed tracking subject reappears, there is a strong possibility that this reappearance position is a position in the vicinity of the obstacle. Thus, the areas around the obstructing area are exclusively searched for the tracking information so that it is possible to reduce the load of processing necessary for the search and determine the reappearance of the obstructed tracking subject in a short time. Moreover, the tracking information other than the focus detection information is used to search for the obstructed tracking subject, so that it is possible to more precisely search for the obstructed tracking subject.

Figure 19A:
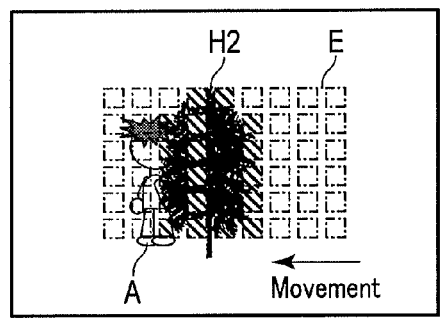
FIG. 19A is a first diagram showing a search process for the tracking subject when the imaging device moves.
Figure 19B:
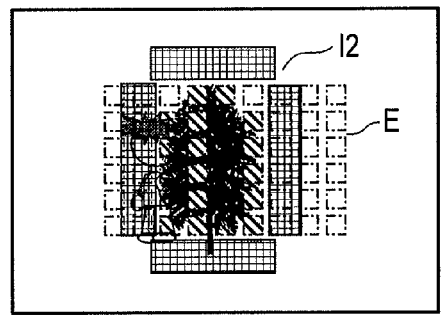
FIG. 19B is a second diagram showing a search process for the tracking subject when the imaging device moves.

Here, according to the present embodiment, the focus detection information is used to detect the obstructing area. In contrast, when the imaging device 100 moves rather than the subject, the obstructing area may be detected without the use of the focus detection information. For example, the user pans the imaging device 100 (moves the imaging device 100 horizontally to the ground) when the obstructing area H1 in FIG. 16 is detected. The obstacle is normally immobile, so that the movement amount of the imaging device 100 resulting from the panning corresponds to the movement amount of the obstructing area H1 on the image. Therefore, the movement amount of the imaging device 100 is detected by the motion detection unit 136, and on the basis of the detected movement amount, the movement amount of the obstructing area H1 on the image is calculated, and then in accordance with this movement amount, the obstructing area H1 is moved as shown in FIG. 19A, so that an obstructing area H2 after the panning can be calculated without the use of the focus detection information. After the obstructing area H2 has been calculated, a search area I2 shown in FIG. 19B is searched for the tracking information, so that even if the imaging device 100 moves, reappearance of the obstructed tracking subject can be determined.

The method of each of the processes by the imaging apparatus according to the embodiments described above, that is, the process shown in each of the flowcharts is stored as a program that can be executed by the CPU 1301. This program can also be stored and distributed in a storage medium of an external storage device such as a memory card (e.g., a ROM card, a RAM card), a magnetic disk (e.g., a floppy disk, a hard disk), an optical disk (e.g., a CD-ROM, a DVD), or a semiconductor memory. The CPU 1301 then reads the program stored in the storage medium of the external storage device, and can perform the processes described above when the operation is controlled by the read program.

What is claimed is:

1. A tracking apparatus comprising:
   a tracking subject setting unit which sets a tracking subject in first image data obtained by imaging;
   a tracking subject search unit which searches for the set tracking subject from second image data obtained by imaging after the first image data is obtained, by using at least one of luminance of the first image data, color of the first image data, a result of face detection in the first image data, and a result of focus detection of the first image data;
   an obstructing detection unit which detects, from the second image data, whether the tracking subject is obstructed; and
   an obstructing area detection unit which detects, from the second image data, an obstructing area which is obstructing the tracking subject when the obstructing of the tracking subject is detected, wherein the obstructing detection unit detects that the tracking subject is obstructed by comparing a standard focus detection information which is a standard information of the tracking subject with a focus detection information obtained at a tracking position, wherein the tracking subject search unit exclusively sets a search area around the obstructing area in the second image data and searches the set search area for the tracking subject in the second image data by using at least one of the luminance of the first image data, the color of the first image data, or the result of face detection in the first image data when the obstructing of the tracking subject is detected in the second image data, wherein the luminance, color, and result of face detection in the first image data are information different from the result of focus detection of the first image data; and wherein the tracking subject search unit searches for the set tracking subject in the second image data by using only the result obtained from focus detection of the first image data, when the obstructing of the tracking subject is not detected in the second image data.

2. The tracking apparatus according to claim 1, wherein the obstructing detection unit detects that the tracking subject is obstructed in the second image data, when a difference between the standard focus detection information and the focus detection information obtained at the tracking position is higher than a predetermined value.

3. The tracking apparatus according to claim 1, further comprising a motion detection unit which detects a motion amount of the tracking apparatus, wherein the obstructing area detection unit detects the obstructing area in the second image data in accordance with the motion amount.

4. The tracking apparatus according to claim 1, further comprising a focus detection information acquiring unit which detects focus states in focus detection areas in an imaging screen, wherein the obstructing area detection unit detects the obstructing area from a difference between a focus state of the tracking subject and the focus state of each of the focus detection areas in the second image data.

5. The tracking apparatus according to claim 4, wherein the obstructing area detection unit detects, as the obstructing area, an area in which a subject exists at a shorter distance than the tracking subject in the second image data.

6. The tracking apparatus according to claim 4, wherein the focus state includes a defocus amount of the tracking subject.

7. The tracking apparatus according to claim 4, wherein the search area also includes an area different from the focus detection areas in the imaging screen.

8. A tracking method comprising:

setting a tracking subject in first image data obtained by imaging;

searching for the set tracking subject from second image data obtained by imaging after the first image data is obtained, by using at least one of luminance of the first image data, color of the first image data, a result of face detection in the first image data, and a result of focus detection of the first image data;

detecting, from the second image data, that the tracking subject is obstructed by comparing a standard focus detection information which is a standard information of the tracking subject with a focus detection information obtained at a tracking position;

detecting, from the second image data, an obstructing area which is obstructing the tracking subject when the obstructing of the tracking subject is detected;

exclusively setting a search area around the obstructing area in the second image data and searching the set search area for the tracking subject in the second image data by using at least one of the luminance of the first image data, the color of the first image data, or the result of face detection in the first image data when the obstructing of the tracking subject is detected in the second image data, wherein the luminance, color, and result of face detection in the first image data are information different from the result of focus detection of the first image data; and searching for the set tracking subject in the second image data by using only the result obtained from focus detection of the first image data when the obstructing of the tracking subject is not detected in the second image data.

9. A non-transitory storage medium storing a tracking program which causes a computer to:

set a tracking subject in first image data obtained by imaging;

search for the set tracking subject from second image data obtained by imaging after the first image data is obtained, by using at least one of luminance of the first image data, color of the first image data, a result of face detection in the first image data, and a result of focus detection of the first image data;

detect, from the second image data, that the tracking subject is obstructed by comparing a standard focus detection information which is a standard information of the tracking subject with a focus detection information obtained at a tracking position;

detect, from the second image data, an obstructing area which is obstructing the tracking subject when the obstructing of the tracking subject is detected;

exclusively set a search area around the obstructing area in the second image data and search the set search area for the tracking subject in the second image data by using at least one of the luminance of the first image data, the color of the first image data, or the result of face detection in the first image data when the obstructing of the tracking subject is detected in the second image data, wherein the luminance, color, and result of face detection in the first image data are information different from the result of focus detection of the first image data; and search for the set tracking subject in the second image data by using only the result obtained from focus detection of the first image data when the obstructing of the tracking subject is not detected in the second image data.

* * * * *